United States Patent
Avargues et al.

[11] Patent Number: 6,104,701
[45] Date of Patent: Aug. 15, 2000

[54] METHOD AND SYSTEM FOR PERFORMING A LEAST COST ROUTING FUNCTION FOR DATA COMMUNICATIONS BETWEEN END USERS IN A MULTI-NETWORK ENVIRONMENT

[75] Inventors: Didier Avargues, Cagnes-sur-mer; Philippe Bazot, Vence; Jean-Francois Bortolotti, Beaulieu-sur-mer; Marc Lamberton, Antibes, all of France

[73] Assignee: International Business Machines Corporation, Amonk, N.Y.

[21] Appl. No.: 08/906,041

[22] Filed: Aug. 5, 1997

[30] Foreign Application Priority Data

Dec. 13, 1996 [EP] European Pat. Off. .............. 96480112

[51] Int. Cl.$^7$ ................................ H04J 3/14; H04M 7/00
[52] U.S. Cl. .......................... 370/238; 370/255; 370/351; 370/400; 379/221; 709/239; 709/241
[58] Field of Search ..................................... 370/216, 225, 370/228, 229, 230, 231, 235, 238, 252, 254, 255, 256, 351, 352, 389, 400; 379/219–221, 229, 268, 269, 271, 272, 273; 709/238, 239, 241; 340/825.01, 825.02, 825.03, 826, 827

[56] References Cited

U.S. PATENT DOCUMENTS

5,533,016  7/1996  Cook et al. .............................. 370/238
5,712,907  1/1998  Wegner et al. .......................... 370/238
5,715,304  2/1998  Nishida et al. .......................... 379/114
5,892,819  4/1999  Stumer ..................................... 379/220

*Primary Examiner*—Alpus H. Hsu
*Attorney, Agent, or Firm*—John D. Flynn

[57] ABSTRACT

A method and system for determining the best data path in a communication network is presented. A Least Cost Routing path between end users in a multi-network environment, including both public and private networks, is determined based upon a longest prefix match. At network activation time, the numbers or prefixes of numbers of end users attached to the public network (304, 305) are stored in entry node data bases A and C of the private network (303). Assuming an end user terminal U1 calls a target end user U3, an entry node B first checks for a longest prefix match between the called number and numbers already stored into its memory. If this is the first time U3 is called via node B, no match will occur and node B will then broadcast a Query to all nodes in the private network (i.e. Nodes A and C). Only those nodes providing possible access to U3 answer this Query. Node B then determines the longest prefix match with the called number amongst the various query answers, and sets the data path via that node having the longest prefix match.

20 Claims, 5 Drawing Sheets

METHOD AND SYSTEM FOR PERFORMING A LEAST COST ROUTING FUNCTION FOR DATA COMMUNICATIONS BETWEEN END USERS IN A MULTI-NETWORK ENVIRONMENT

FIELD OF THE INVENTION

This invention relates to communication networks and more particularly with a method and system for providing a least cost routing function between end users of a multi-network environment.

BACKGROUND OF THE INVENTION

In this communication era there is an increasing need for facilities to provide fast communications between end users, at the lowest possible cost for said users.

This is further emphasized by the increasing competition between carriers. Increasing use of communication facilities, has increased competition between private companies herein referred to as customer network and service provider networks (building international communication networks for offering communication services to the public). The latter shall be referred to, herein, as international service provider networks. Also, most countries are still running their own public telephone networks. Finally, these different types of networks are often interconnected, providing a multi-network facility to users throughout the world.

The situation is further compounded by the fact that in most private networks, the private companies running the networks may own node facilities, they often do not own the interconnecting lines. These lines are leased by a carrier at prices fixed (i.e., per year) no matter whether they are fully used or not. Accordingly, optimizing line bandwidth occupation is a must for the private network owner.

In the U.S., the available links include so-called T1 operating at 1.544 Mbps and T3 at 44.736 Mbps, while in Europe one may find E1 at 2.048 Mbps and E3 at 34.368 Mbps. The tariffs applied in 1995 were, in France (in K$ per month) as indicated hereunder:

|      | 50 km | 250 Km | 500 Km |
|------|-------|--------|--------|
| E1 = | 2     | 10     | 14     |
| E3 = | 50    | 150    | 170    |

The above, helps demonstrate the importance of optimizing link bandwidths for the network. Properly designed networks must include means for orienting the traffic between the network nodes to fulfill these actual optimal bandwidth occupation requirements.

On the other hand, public telephone network owners do apply their own tariffs based on several parameters including distance travelled by the user's traffic within the network (i.e., distance between network entry and exit); duration of the connection; and the time of the day or period of said traffic.

Figure 1:
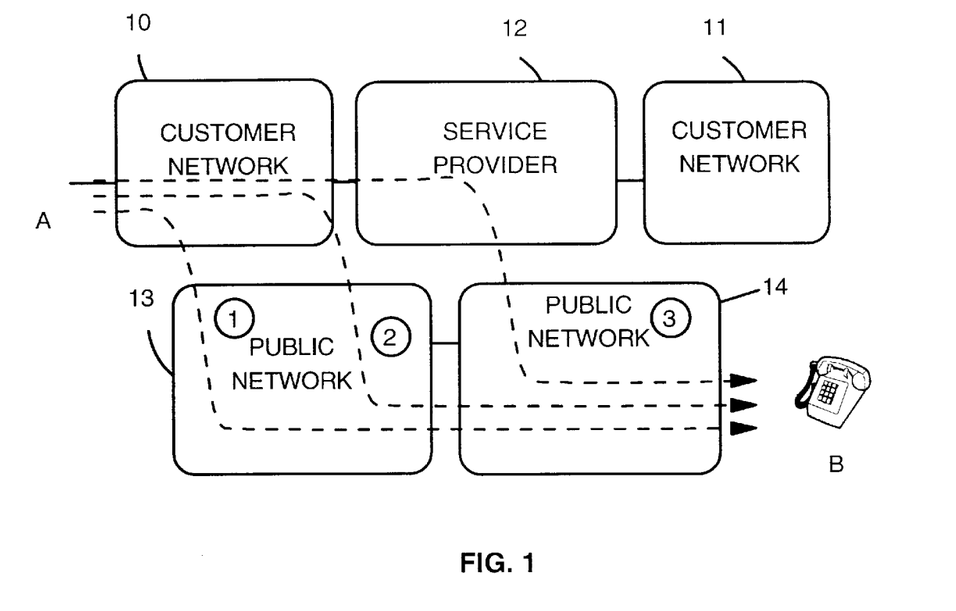
FIG. 1 shows various paths which could be used for interconnecting a calling end user A to a destination or target end user B in a multi network environment.

Finally, actual communications between end users (including service providers) often follow rather complex paths which might include going through several kinds of networks. For instance, assume a situation of interconnected networks as represented in FIG. 1. Two customer networks (10 and 11) are attached to a service provider network (12) which might extend internationally. The system also includes two public networks (13 and 14) each covering a different country (e.g. France and Germany). All these networks are interconnected into a multi-network facility as represented in the figure. A request issuing from end user A calling end user B may be executed to follow any one of the three paths (1), (2) or (3) represented by the dotted arrows in FIG. 1.

One issue in such an environment is to find, at said call set-up, the path which optimizes the communication cost for the end user (customer). This is the function of the so called Least Cost Routing (LCR) process. With the presently available price parameters, the LCR path, in the case of a call from A to B as represented in FIG. 1, should be achieved by selecting the path with the shortest distance within the public networks. This is due to the fact that public network tariffs are usually higher than the cost within the private networks and are a function of the path length within said network. Accordingly, path (3) should be the best one for connecting A to B, and the LCR process should operate within the private network, be it a customer or a service provider network, for selecting the best private network port and trunk(s) to achieve said LCR accordingly.

Figure 2:
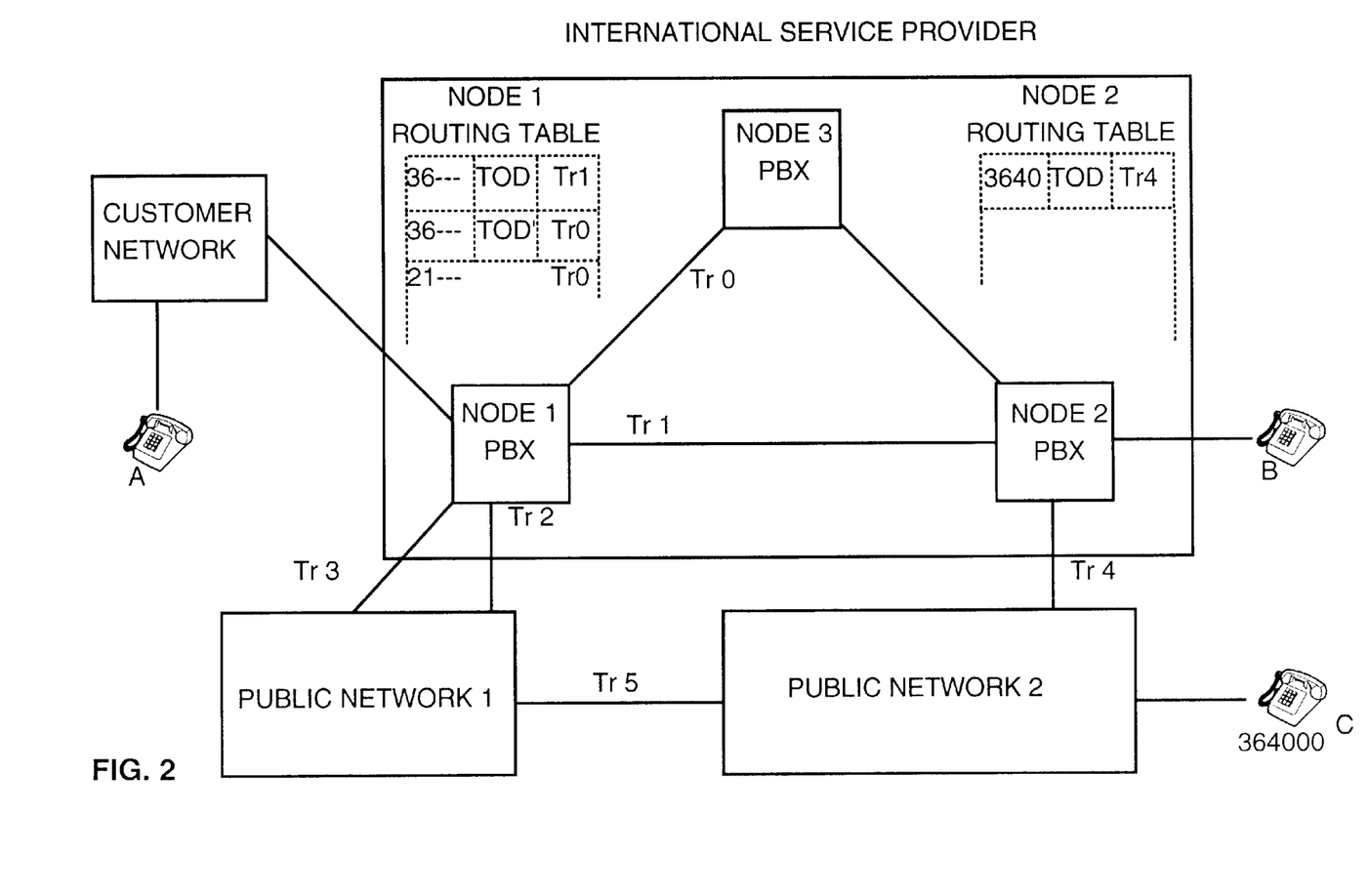
FIG. 2 is a representation of presently available facilities for interconnecting end users in a multi-network environment.

FIG. 2 shows schematically, a network (similar to the network of FIG. 1), with the presently available facilities within the service provider (private) network and the public network, for establishing a path between end users' terminals. Assuming that the end user A (telephone set) is calling telephone set C (or any service provider connected via public network) which has been assigned a telephone reference number 364000 (which reference, herein also designated as "number" can also bear an alpha-numerical form) and that terminals A and C are attached to a private network service provider including three nodes (Node 1, Node 2 and Node 3) with means for digitally encoding the voice signals. These nodes being located on a private telephone network, they include telephone switches called Private Branch eXchanges (PBX's). These PBX's allow going into intra-enterprise communication without going through public network, as well as providing access to the public telephone network.

Node 1 is attached to Node 2 via a trunk Tr1 which may be a leased line (L.L). Node 3 is attached to both Nodes 1 and 2, with the connection between Node 1 and Node 3 operating via trunk Tr0. Also represented are two public networks PN1 and PN2, with PN1 being connected to the private network via trunks Tr2 and Tr3, issuing from Node 1, while PN2 is connected to the private network via trunk Tr4 issuing from Node 2. Both public networks PN1 and PN2 are interconnected via a Trunk Tr5. The network PN2 might be a public telephone network including Central office eXchanges (CX's) of both types (i.e., access CXs concentrating telephone subscribers' (users') lines directly attached therein and transit CX's handling inter-CX's traffic at regional, national or international level).

In presently available networks, each node trunk connection down to an extension is assigned a numbered physical connection which is recorded in a routing table. For instance, Node 1 may include a routing table associating the trunk Tr1 to the table entry 36 . . . ; the trunk Tr0 to entry 21 . . . etc. . . Node2 may include a routing table associating trunk Tr4 to the entry 3640. . . In other words the routing tables are configured in a "hop by hop" manner to enable setting the path throughout the network by matching to progressively increasing portions of called user terminal address (e.g., telephone number). In addition the routing tables include several entries per destination, including: prioritized alternate routes; route selection based on circuit availability; route selection based on Time-Of-Day (TOD)

according to the tariff applied for the call; etc. . . . , all information required for implementing the Least Cost Routing function. All required data are manually entered into the tables in the form of so called wildcarded data and it should be understood that the required table data are lengthy to store.

Also, the private network owner may need access to a terminal attached to the public network while fulfilling Least Cost Routing requirements should not only configure his network facilities accordingly, (i.e., offering the path encompassing the shortest path through the public network, and manually enter the wilcarded data) but, should also update these data as often as required while always optimizing link bandwidths within the network.

A person of ordinary skill in the art fully appreciates a method for avoiding the hassle of the above facilities operation for providing Least Cost Routing function.

OBJECTS OF THE INVENTION

An object of the present invention is to provide a method and system for finding, at call set-up, the path which minimizes the communication cost (Least Cost Routing) for end users interconnected in a multi-network environment by minimizing the path length through public network(s) within said multi-network.

Another object of this invention is to provide a method and system for performing a Least Cost Routing function in a multi-network environment, presently available in the field, with minimal development expenses.

Still another object of this invention is to provide a method and system for performing Least Cost Routing function independent of varying tariff conditions such as tariffs based on time-of-day, or date etc. . .

A further object of this invention is to provide a method and system for performing Least Cost Routing function, that is easy to implement and thus reduce the hassle of having to reconfigure the network.

Another object of this invention is to provide a method and system for performing Least Cost Routing function that supports dynamic changes in the network.

A further object of this invention is to provide a method and system for performing Least Cost Routing while supporting network failure recovery at optimized cost.

A still further object of this invention is to provide a method and system for performing Least Cost Routing function while optimizing link bandwidth within the network.

A still further object of this invention is to provide a method and system for performing Least Cost Routing function that is compatible with presently existing Directory Service mechanisms.

SUMMARY OF THE INVENTION

The above mentioned objects of the invention are achieved by a method for setting a communication path (in a multi-network environment including both so-called private and public networks interconnected to each other via network nodes and links) for an end-user connected to a private network calling an addressable target component accessible to said calling end-user via a public network, said addressable target being herein designated as resource which can be identified by a numerical or alpha numerical address, both herein referred to as numbers, said method including: storing, at network activation time, in each private network node a routing table or directory data-base including the numbers or prefixes of numbers of public network attached resources accessible through said private network node; and for each call, checking in the private network entry node for the calling end-user, whether the called number or a corresponding prefix of said called number is registered in said entry node directory data-base; and, if registered, then setting the path looked for, through said entry node; otherwise causing said entry node to broadcast a query for the called number to the private network nodes; setting, in each directory data-base of queried private network nodes, a search for the called number or prefixes of said called number, and sending the corresponding detected numbers or prefixes to the calling entry node; monitoring the answers to said query in said calling entry node, checking therein for the best match (i.e., the longest prefix matching answer); and, setting the entry to the public network through the private network node which provided said best matching answer to the broadcasted query.

These and other objects, characteristics and advantages of this invention will become more apparent from the following detailed description of a preferred embodiment of the invention when considered with reference to the accompanying figures.

DESCRIPTION OF A PREFERRED EMBODIMENT OF THE INVENTION

This invention is designed to minimize impact to already available digital communication systems and additional development costs are optimized. In other words, the invention is implemented with network facilities (e.g. node architectures) presently available in the field. These networks are made to transfer fixed or variable length data packets in a multimedia environment. The data packets include both data traffic packets and control traffic packets, with the latter being meant to perform network control and maintenance operations including call set-up, line error handling and recovery, etc. . . , as well as bandwidth management functions. The data packets may also be assigned different priority levels which further complicates the system. Various Quality of Service (QoS) levels are defined accordingly, with the highest priority being assigned to real time data (e.g., voice data, video data) which may tolerate lost packets but, not excessive transit delay variations. For details on these networks, one may refer to the European patent Application published on Nov. 29, 1995, No. 0684716 entitled "A Data Communication Network and Method for Operating Said Network".

It should be understood that multi-networks are rather complex and expensive to both build and operate. Each network may include a large number of the so called network nodes interconnected by physical or virtual trunks. The node basically includes input and output adapters with buffers interconnected through a so-called switching structure. The adapters are meant to process data of different priority levels and are accordingly provided with processor means. The base function of these processor means is to analyse protocols and route messages. They are capable of analysing transport and access protocols and routing data from/to the line, the switch or the node processor facilities. They also store network topology data in so called topology databases, as well as directory databases. The directory databases are controlled by a directory agent, participating in so-called directory services and whose role is to locate a resource within the network. The directory services are distributed in the network among several directory agents. Each directory agent maintains a local directory database which contains information about external resources owned by the access agent or external resources which have been queried and dynamically "cached" (i.e. stored).

In other words, the directory services represent a set of distributed services in charge of locating resources in large high speed packet switching networks. A resource is an addressable component, external to the network which can be a source or sink for data. To allow connection establishment, these services are also in charge of obtaining the characteristics associated with such resources. For example, directory services determine resource ability to sustain network connections with a given Quality of Service (QoS).

Locating a resource means determining the address within the network that is required to determine a routing path within this network. To perform this job, the directory services rely on the use of the distributed directory database. Each network access point is responsible for maintaining a directory of its local resources (local directory database).

Since the directory information is distributed, as described above, an efficient means is needed for searching the network directory databases. Searches are either local or remote. When a source resource is willing to establish communication with some other resource (target resource), the network access point associated with the source resource attempts to locate the target resource and set the path throughout the network(s) accordingly. The request can sometimes be satisfied locally. This can occur when the target resource is attached to the same access point as the source resource, or if the requested information is already available in the local directory database of the source resource access point.

If the search cannot be satisfied locally, a broadcast search request is sent into the network. Well known algorithms (such as flooding or based on the use of a so-called Spanning Tree) may be used for this search, as long as it is consistent across all nodes.

The flooding method operates as follows. The originating node sends its information in the form of a packet to its neighbors (the nodes to which it is directly connected with a link). The neighbors relay this information to their neighbors, and so on, until the packet reaches all nodes in the network. Two additional rules are also observed, which limit the number of packet transmissions. First, a node will not relay the packet back to the node from which the packet was obtained. Second, a node will transmit the packet to its neighbors at most once.

The second method is based on the use of a spanning tree. A spanning tree is a connected subgraph of the network that includes all nodes and has no cycles. Broadcasting on a spanning tree is more communication efficient than flooding. It requires a total of only N−1 packet transmissions per packet broadcast, where N is the number of nodes in the network. In a preferred embodiment of this invention a spanning tree is used to interconnect all the nodes in the network.

The broadcasted search request reaches all the access points of the network therefore, if the target resource is reachable the network access point responsible for the target resource replies positively to the broadcasted search request. This reply is sent back to the origin node and the resulting information can optionally be "cached" (i.e. stored) in the origin access point's local directory database, to be available for later reference.

To minimize overload introduced by unsuccessful queries into the network, directory agents may be organized in sets using a set management function. With such partitioning, access agents that are queried are those that are the most likely to provide access to a target.

Figure 3:
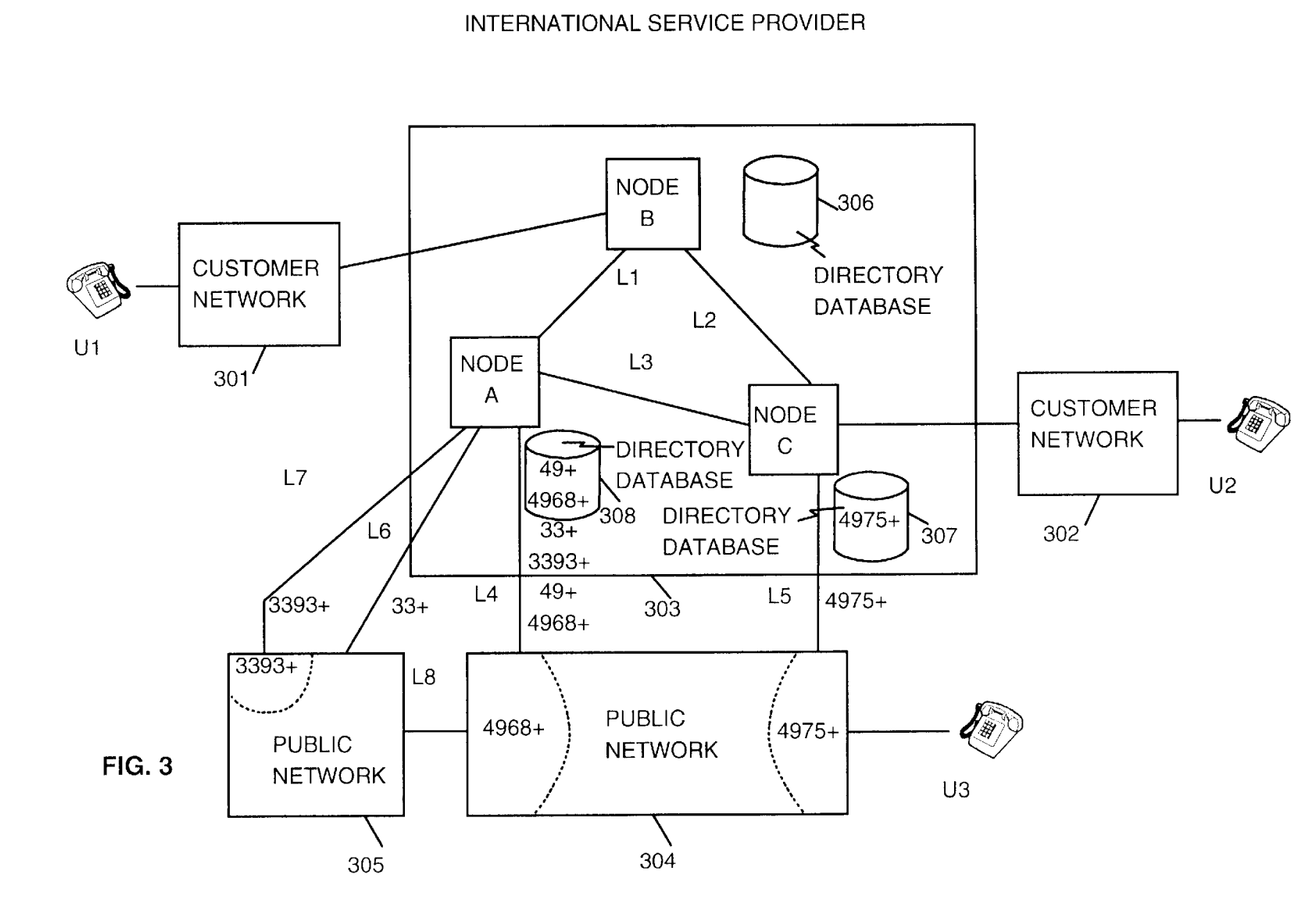
FIG. 3 is a schematic representation of a simplified multi-network which illustrates the operation of this invention.

A simplified multi-network is used to illustrate the invention, as represented in FIG. 3. Two customer networks (301 and 302) are attached to a private network (303) (e.g., international service provider). Also attached to said private network (303) are a public network (304) and a public network (305). The private network (303) includes three nodes (labelled A, B and C respectively) interconnected via three links: L1 between A and B, L2 between B and C and L3 between A and C. The node A, B and C are network nodes architectured as described above and thus are provided with the required facilities such as directory facilities, including databases (306, 307 and 308). The node interconnecting links are high speed lines each including a number of physical or virtual channels. These transmission lines might be leased lines and therefore the private network owner shall need to optimize the lines bandwidth occupation. Accordingly, network control data should be minimized while ensuring optimal operation in terms of Quality of Service, link or node failure recovery, etc.

The multi-network of FIG. 3 may extend over several countries, say France and Germany, the invention shall take advantage of the fact that in a number of countries, public addressing plans are hierarchical (see the "Number Plan for ISDN era", ITU Recommendation E 164), and therefore the public address space is split into areas, each provided with an area code. For instance, the network (304) may cover a whole country, say Germany, assigned a country code 49 and the network (305) cover France. Within Germany, two different cities have been assigned area code 4968 and 4975 respectively.

Assuming that the public network (304) is accessible from the private network (303) through two links labelled L4 and L5 respectively, public network (305) is accessible through L6 and L7 while L8 interconnects networks (304) and (305).

At network activation time, each access to public network in the corresponding node, is registered through the directory services indicating the telephone numbers directly accessible through corresponding private network node and attached link. These numbers represent the geographic area that can be reached, at low rate, through this access. These registrations are recorded in the form of so called "wildcarded" data. For instance, the access L4 is registered (i.e. cached) with 49+ and it can be used to reach the public network subscribers in Germany area. Some access may be registered with 4968+ and can be used to reach the public network subscribers of a specific German area or city. The access L5 is registered with 4975+ and can be used for optimal cost connection to another German city. Similarly, all France subscribers are reachable throughout L6 for 33+ coded numbers, while the subscribers of Nice area are reachable through L7 with 3393+ numbers.

Note for instance, that wildcarded registration could be taken advantage of, fairly simply for contiguous values. For instance, for a numbering range from 3300 to 3399 representing the numbers (or prefixes) that can be given, the resource 33+ can be registered in the directory database (308) attached to node A. But sometimes, the range is not as simple and there is a significant probability that a customer shall have to manually enter the values into the directory database and could make a mistake, even with checking procedures. This is a good reason for minimizing the wildcarded data required for performing the Least Cost routing operations as well as for minimizing data changes. With current methods and means for performing Least Cost Routing, for example between end user U1 attached to customer network (301) and user U3 attached to public network (304), the wildcarded data to be used are not only complex, but they are also variable, as disclosed with reference to FIG. 2. Accordingly, the risks of errors while storing or updating the nodes directory databases are seriously higher than considered herein. The database tables are still complicated by the requirements of a back-up path to be used in case of path (node or link) failure. It is therefore necessary to store data for back-up least cost routings.

The present invention provides a method for minimizing the wildcarded data required for performing Least Cost Routing operations, and avoiding the hassle of repetitive updatings of the wildcarded data. The required table configurations shall be minimized and limited to the private network ports.

To that end, each network node stores in its local directory services facilities the address numbers or prefixes of the locally connected resources. Say 49+ and 4968+ for link L4; 33+ for link L6 and 3393+ for link L7 for the database (305) in node A, and 4975+ for link L5 for database (307) in node C.

Figure 4:
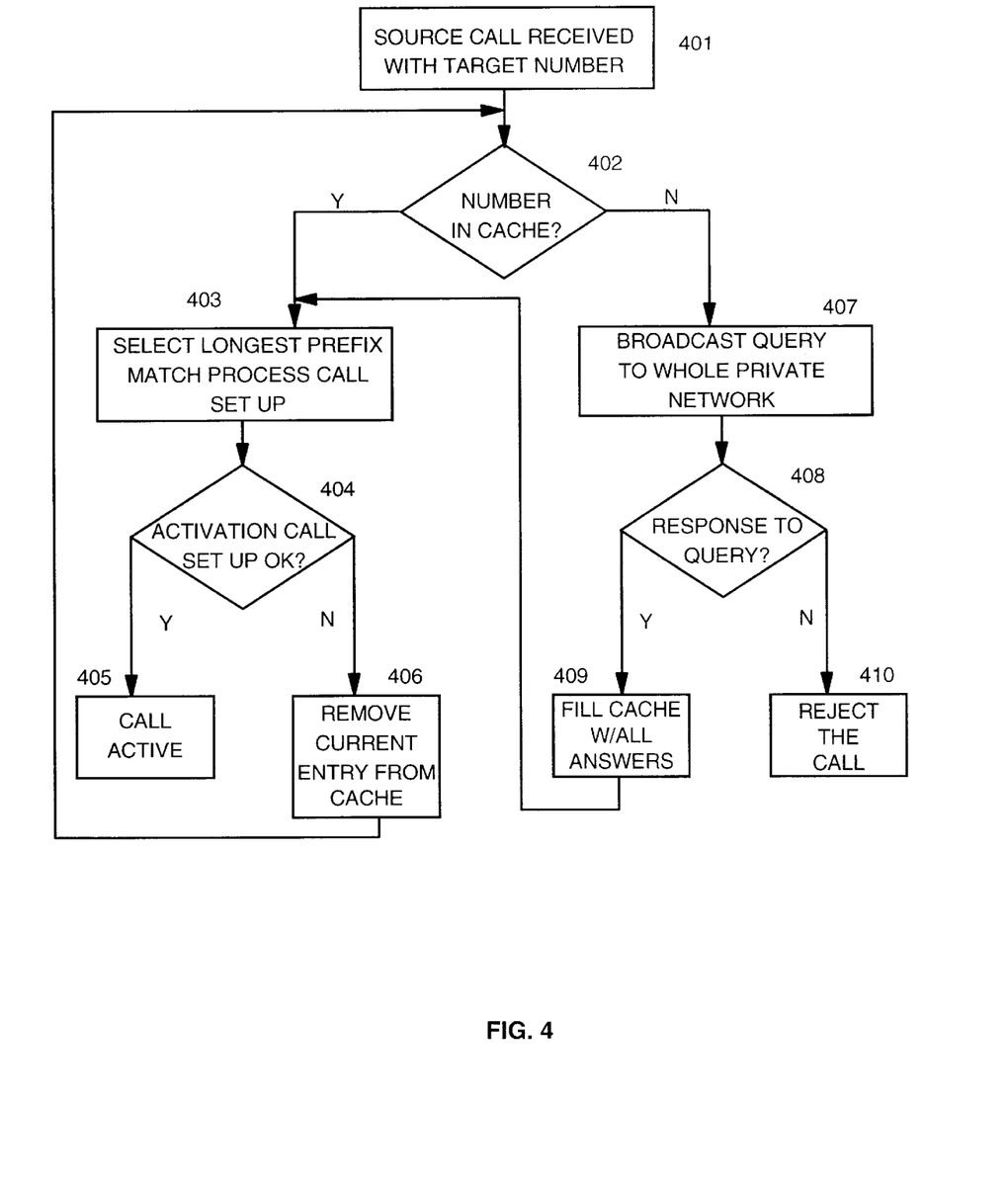
FIG. 4 is a flowchart for implementing the method of processing source calls with target numbers.
Figure 5:
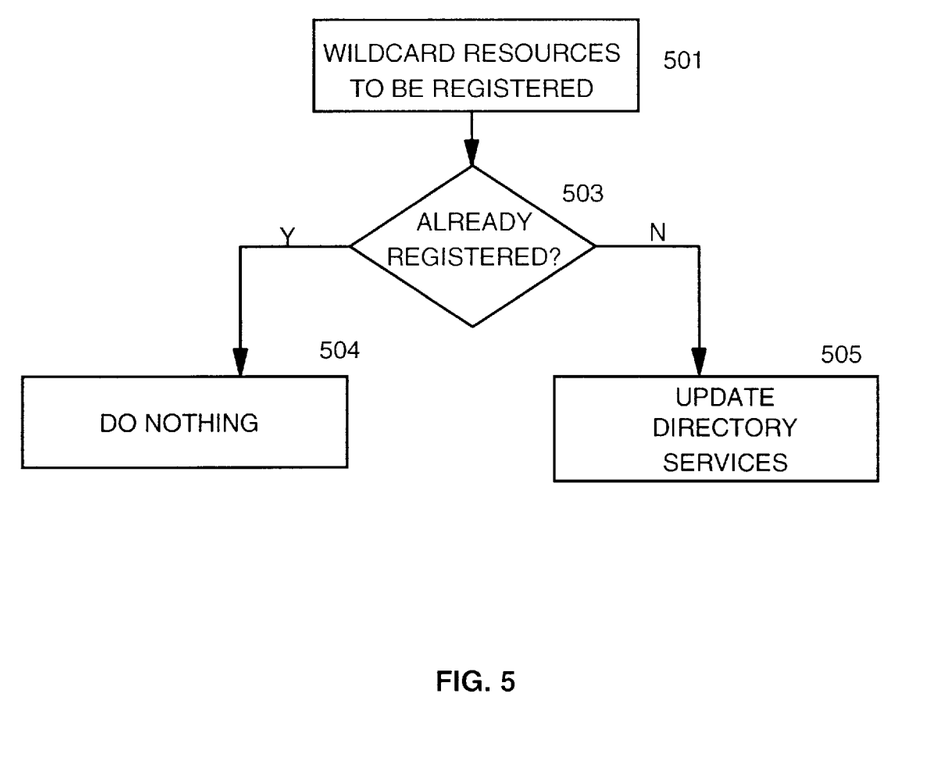
FIG. 5 is a flowchart for implementing the method of processing wildcard resources to be registered.

Then, in operation, the method for performing the Least Cost Routing function according to the invention shall proceed according to the flowchart of FIGS. 4 and 5. When a call is received from a source (step 401) it contains the number identifying the destination resource or sink. The first operation to be performed (step 402) by the directory services of the entry node is to scan its local cache table to determine if one occurrence of the called number exists. If the answer is "Yes", (several entries might match said called number). The directory services shall then run a routine looking for the entry providing the largest match with called number prefix, in other words, the so called best matching resource prefix (step 403).

Two algorithms are already known for finding longest matching prefixes in a database, one is named "Trie" (as in "reTrieval"), the other is named "Binary Search".

In the preferred embodiment of this invention uses the so called "trie" algorithm, named PATRICIA (for Practical AlgoriThm to Retrieve Information, Coded In Alphanumeric) disclosed by Donald R. Morrison, in the Journal of ACM, 15(4):515–534, October 1968, and improved by Willibad Doeringer et al, IBM Research Division, Zurich Research Laboratory, May 4, 1995.

Once the longest prefix match has been determined between the target resource number and the considered node wildcarded numbers stored herein, then the call set up is processed through conventional Network BroadBand Services (NBBS) which will reserve the required resources in the network.

Next, step 404 involves checking through directory services, at the destination whether the requested resource is still available or is active. If the resource is available, the call is set active (step 405). In this case, the call has been processed successfully, data (e.g. voice or video) can be exchanged thru the network with all requested parameters (e.g. QoS being guaranteed). Otherwise (step 406), if the resource was already not available the activation of the call has failed at the destination since the resource has been removed or is not available. In this case, the process loops back to step 402 and, at the origin, the selected entry is removed from the "cache" of the directory services.

Should the answer to test of step 402 be negative, indicating no match with searched number (or prefix) in considered node cache. Then, step 407 is performed. A query is broadcasted via the spanning tree structure, and through all the NBBS network to determine where, in the distributed database, the destination resource is located.

The queried candidate nodes answer said query and, in step 408, the responses to the above mentioned query are analysed in the entry node. In case of no answer the call is rejected since the destination resource cannot be contacted (step 410). Otherwise, when the destination resource has been located in the distributed database, the destination directory services respond positively to the query. Several positive query answers can occur if the destination resource identification (number or prefixes) has been registered in several places in the network. Then, all the answers are stored in the cache (step 409). The process may then loop to step 403 to select the longest prefix match. But, still, all other answers, cached in step 409 will be used as back-ups if the best longest prefix is no longer available or no longer configured.

Represented in FIG. 5 is a flowchart for performing resources registrations. At system power-on all the configured resources are registered (cached) in the local directory services (e.g. in the considered port/node database step 501). Then in operation (e.g., upon response to a query see steps 406, 408 and 409 in FIG. 4 for instance), the process checks whether the detected resources are already locally registered, if yes, there is no reason to update the directory services (step 504); otherwise the directory services are updated accordingly (step 505).

To illustrate the above described method, we return to FIG. 3 and assume that user U1 connected to the private network (303)(node B) through customer network (301), and is calling a user U3 attached to public network (304). This is an on-net to off-net call particularly suitable for applying the invention.

At network activation time, each access to the public networks (i.e., through L4, L5, L6 and L7) are registered to the NBBS directory services with wildcarded telephone numbers. Each wildcard represents the geographic area(s) that can be reached, at least cost rate, thru this access. For instance, the access through L4 is registered with 49+ and 4968+, it can be used to cover the entire Germany (through 49+) or reach directly a specific German area (4968+). L5 can be used to reach directly customers in another German area (4975+). L6 and L7 shall be used respectively to reach the entire France (33+) or to reach more directly the public network subscribers in Nice area (3393+).

The first time U1 is calling U3 (49752302) attached to Public Network 304, said call being made through Customer Network (301) attached to entry node B of private network (303), the NBBS directory services broadcast QUERY (49752302) to the whole international private network (303). Both accesses through L4 and L5 answer to query, since they both match with the called number. Both their answers i.e. 49+ for L4 and 4975+ for L5 are locally cached in the directory services facilities of the origin NWays node (i.e. Node B). These directory services shall then run a routine based on the PATRICIA Algorithm and select 4975+ as being the longest prefix matching with called number. Conventional NBBS call set-up procedure is then executed to set the path to the required connection down to link L5 and then through public network (304). The next time U1 is calling 49752302 or any number starting with 4975, the local (Node B) directory cache contains both 49+ and 4975+. The directory services shall directly select the longest prefix match, i.e. 4975+, with no broadcast being required. The path is more optimum. As soon as the directory services cache is filled-in, the Least Cost Routing path selected is optimum. In particular, this means that the LCR method of this invention is always optimum for the most frequently called destinations; which saves much on public telecommunication costs.

In addition, should the link L2 within the private network (303) fail, the first time U1 is calling U3, due to QUERY (49752302) being broadcasted by the directory services, node C answer shall go through L3 and L1 and then again up to node B. Therefore the connection between U1 and U3 shall still be set through L5, i.e. the Least Cost Routing (LCR) is still operable.

Also, once given the private network (303) entry and exit nodes, conventional means for optimizing bandwidth distributions within said network (303) are still operable.

If, for any reason, the L5 access to public network (304) fails, the next time U1 calls 49752303, the path through L5 fails. The cache entry 4975+ is erased from said cache. The only match to said call is then with the access 49+ via L4. The traffic is now routed through access L4, which is the best available path. In other words, the system has automatically found a back-up path, which again saves a lot of control traffic that would otherwise be necessary. A person of ordinary skill in data networking art shall certainly appreciate this valuable advantage of the invention.

Another benefit is that the amount of data to be configured is drastically reduced in that the private network owner has only to register, for each access to the public network(s), and only for these accesses, the wildcarded numbers that can be reached through said access. Then the Least Cost Routing path setting process is automatic and needs none of the additional parameters required by the conventional methods.

Finally, the hassle of registering said wildcarded numbers will be limited. To appreciate this additional feature the problem will be more clearly defined.

Generally all possible telephone numbers belong to a range of contiguous values, it is therefore not necessary to provide an exhaustive list of numbers but only the lowest and the highest values. From these two values protocol agents located in the node directory services could generate and register all the possible numbers to the directory agent (DA). At this step, we can take advantage of the support for wildcarding provided by the DA. For example, if the range 1000 to 1199 represents the numbers that should be accepted in order to route the calls to the attached node, the resource id's 10+ and 11+ could be registered in said node. The customer could therefore reduce the number of entries in specifying wildcards.

Sometimes, the range is not as obvious as in the previous example and there is a significant probability that a customer who manually enters the values will make mistakes. In any case there would be no checking of wildcarded values and the original range of values.

If one could define a device that allows the customer to simply enter a range of values that derive a minimum number of resource id's in optimizing the use of wildcards.

The following algorithm is able to derive the complete list of resource id's in optimizing the use of wildcards from any range of values of four digits, for example. This algorithm suppresses the possibility of misconfiguration in providing an easy interface to the customer, as well as reducing the minimum the number of resource id's to be registered in the node tables.

Considering the case of telephone numbers of 6 digits (ABabcd) where only the 4 last digits (abcd) vary.

If the range ABabc0–ABabc9 belongs to the range that has been given by configuration (i.e. is contained by the interval [low,high]) then the wildcard ABabc+ can be used.

Furthermore, if the range ABab00–ABa999 belongs to the configured range, then the wildcard ABab+ can be used, covering a wider range than before. Again, the intervals ABa000–ABa999 (potentially leading to ABa+) and AB0000–AB9999 (potentially leading to AB+) are checked.

At some point in time, an interval may not be contained in the original range (exceeding the highest value or being below the lowest), the algorithm goes back to the level of the previous digit and computes the list of wildcards representing subintervals contained in the range.

EXAMPLE low=324000
high=325324
AB=32
abcd varies from 4000 to 5324

320000–329999 does not belong to [low,high]
==> go down by one digit (32+ cannot be used, let's try 32a+).

The subinterval 324000–324999 belongs to [low,high]
==> 324+ is added to the list (a=4).

325000–325999 does not belong to [low,high]
==> go down by one digit (a=5 cannot be used, let's try 324b+)

The subinterval 325000–325099 belongs to [low,high]
=> 3250+ is added to the list (b =5).

Again, at this level the algorithm may exceed the range and need to go back to the level of the previous digit to compute wildcards representing sub-subintervals.

This process can be repeated until full members need to be listed.

Finally, low=324000, high=325324 lead to the following list of resource id's:
324+
3250+
3251+
3252+
32530+
32531+
325320
325321
325322
325323
325324

While this invention was described with reference to specific examples, it appears evident that the method disclosed herein applies to most multi-network environments. In addition, the so-called telephone number may address terminals other than a telephone set, (e.g. a FAX, a data terminal, or a server, etc. . .).

Also, it shall be appreciated that updating for any reason, say for tariff changes, is simple to accomplish. For instance, in the example of FIG. 3, if reaching U3 becomes cheapest through L4 rather than through L5, the network (303) operator may force 4975+ into database (305) table and bar it from table 307, and the Least Cost Routing of the invention still matches perfectly.

While the invention has been particularly shown and described with reference to a preferred embodiment, it will be understood by those skilled in the art that various changes in form and detail may be made therein without departing from the spirit and scope of the invention.

What is claimed is:

1. In a multi-network environment including both private and public networks interconnected to each other via network nodes and links, a method for setting up a communication path for an end-user connected to a private network and calling an addressable target component accessible to said calling end-user via a public network, said addressable target component identified by a numerical or alphanumerical address, said method comprising:

storing, at network activation time, in each node of the private network, a directory having routing information including the numbers or prefixes of numbers of public network attached resources accessible through said private network node;

receiving a source call from a calling end-user at an entry node to the private network, said source call including a called target number of a called end-user;

checking in the private network entry node, for the calling end-user, whether the called target number or a corresponding prefix of said called target number is stored in said entry node routing information; and, if stored, setting a path to the called target number through the private network using routing information associated with the longest prefix in the directory matching the called target number; otherwise causing said entry node to broadcast a query for the called target number to the remaining nodes in the private network;

searching, in each directory of the queried private network nodes, for the called target number or prefixes of said called target number, and sending any corresponding detected numbers or prefixes to the entry node;

monitoring the answers to said query in said entry node, checking for a best match; and, setting the path to the public network through the private network nodes which provided the best matching answer to the broadcasted query.

2. The method of claim 1 wherein the directory has a routing table.

3. The method of claim 1 wherein the routing information stored in the directory is stored in a database.

4. The method of claim 3 wherein said broadcast query uses a spanning tree or a subgraph architecture of the private network to broadcast the query.

5. The method of claim 3 further comprising the step of updating the directory database with the results of the broadcast query.

6. The method of claim 5 wherein network updates are performed through simple reactualization of specific network entry nodes directory databases.

7. The method of claim 6 wherein said specific network entry node databases reactualization are performed when communications tariff changes.

8. The method of claim 6 wherein said specific network entry node databases reactualization are performed in case of node or link failure within said private network.

9. The method of claim 1 wherein said calling end-user and called end user are attached to the multi-network system through telephone sets.

10. The method of claim 6 wherein checking for the best match uses a longest prefix match determination which is performed through use of a "trie" algorithm.

11. In a multi-network environment including both private and public networks interconnected to each other via network nodes and links, a system for setting a path between a calling telephone end-user connected to a private network entry node and a called target telephone end-user connected to a public network, both end-users having telephone numbers, said system comprising:

means for storing, at network activation time, in each node of the private network, numbers identifying the telephone sets directly accessible through said private network node, or prefixes of said identifying numbers;

means for receiving a source call from a calling telephone end-user at an entry node to the private network, said source call including a called target number of a called target telephone end-user;

means for checking in the private network entry node, for the calling telephone end-user, whether the called target number or a corresponding prefix of said called target number is stored in said entry node directory database, and, if stored, setting a path to the called target number through the private network matching the longest prefix of said called target number via said entry node, otherwise causing said entry node to broadcast a query for the called target number to the remaining nodes in the private network;

means for searching, in each directory database of queried private network nodes, for the called target number or prefixes of said called target number, and means for sending any corresponding detected numbers or prefixes to the entry node;

means for monitoring the answers to said query in said entry node, and means for checking therein for a best match; and, means for setting the path to the public network via the private network nodes which provided said best match.

12. The system as claimed in claim 11 wherein said means for checking whether the called target number or a corresponding prefix of said called target number is stored in said entry node directory database uses a "trie" algorithm.

13. The system according to claim 12 wherein said telephone numbers are defined according to an ITU Standard E164.

14. The system as claimed in claim 11 wherein said means for storing the directory databases include means for defining the telephone numbers in a wildcarded form.

15. The system according to claim 11 wherein the called target, accessible via the public network is a telephone like terminal.

16. In a multi-network environment including both private and public networks interconnected to each other via network nodes and links, a node having a sub-system for setting a path between a calling telephone end-user connected to a private network entry node and a called target telephone end-user connected to a public network, both end-users having telephone numbers, said sub-system comprising:

means for storing numbers identifying telephone sets directly accessible through said node, or prefixes of said identifying numbers;

means for receiving a source call from a calling telephone end-user said source call including a called target number of a called target telephone end-user, means for checking, for a calling telephone end-user, whether a called target number or a corresponding prefix of said called target number is stored in a directory database, and, if stored, setting a call path to the called target number through the private network by matching the called target number with the longest prefix of said called target number located in the directory database, otherwise causing transmission of a broadcast query for the called target number;

means for monitoring responses to said broadcast query and means for checking for a best match; and, means for setting the call path using said best match.

17. The node of claim 16 wherein said sub-system further comprises:

means for responding to broadcast queries by searching for a broadcast query number or prefixes of said broadcast query number, and transmitting any corresponding detected numbers or prefixes.

18. The node of claim 16 wherein said means for checking whether a called target number or a corresponding prefix of said called target number is stored in a directory database uses a "trie" algorithm.

19. The node of claim 18 wherein said telephone numbers are defined according to an ITU Standard E164.

20. The node of claim 16 wherein said means for storing numbers include means for defining telephone numbers in a wildcarded form.

* * * * *